Nov. 10, 1942.   H. H. KAPLAN ET AL   2,301,410
CROCHET PATTERN DEVICE
Filed June 6, 1940
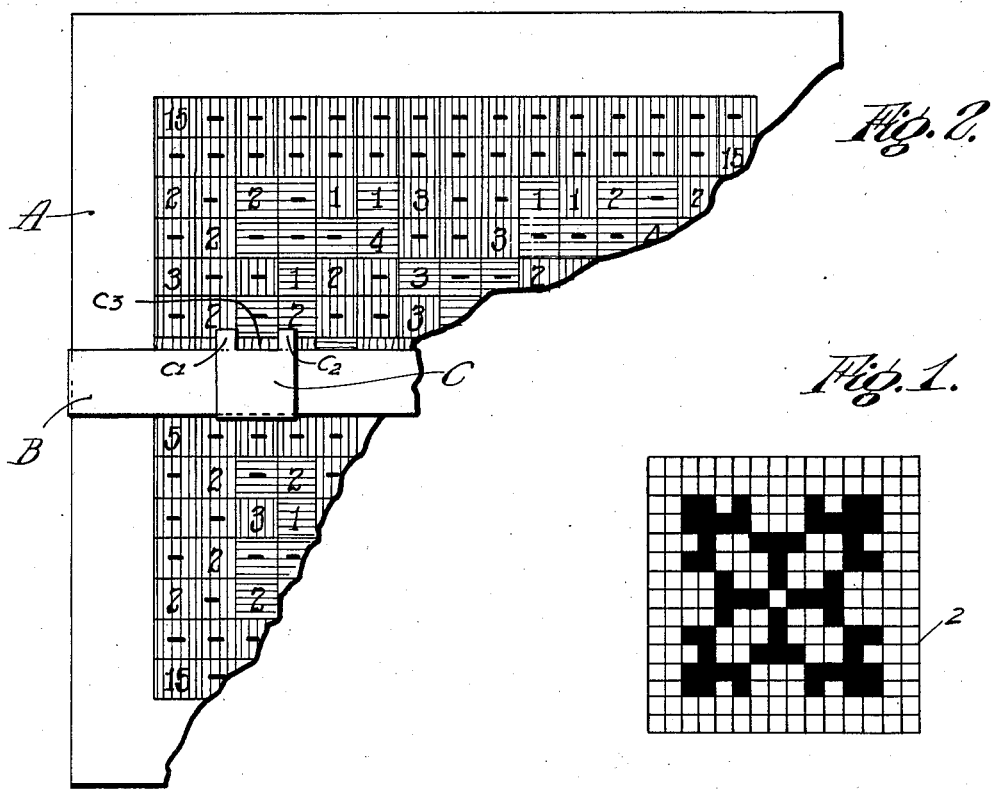
Fig. 2.
Fig. 1.
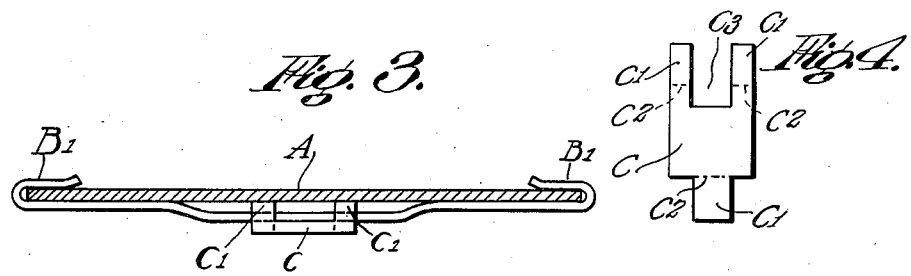
Fig. 3.   Fig. 4.
INVENTOR.
Harry H. Kaplan and
BY Harry H. Burton.
Cooper & Ross. Attorney.

Patented Nov. 10, 1942

2,301,410

UNITED STATES PATENT OFFICE 2,301,410

CROCHET PATTERN DEVICE

Harry H. Kaplan, Springfield, and Harry H. Burton, Worcester, Mass.

Application June 6, 1940, Serial No. 339,141

1 Claim. (Cl. 35—14)

Our invention relates to improvements in a crochet pattern device and it is directed more particularly to the provision of a unique and novel means for assisting a person in his crochet work which is characterized primarily by its relatively low cost of manufacture and secondly by its extreme simplicity as a guide means for greatly facilitating crochet work in certain of its aspects.

It is another object of our invention to provide a device which will serve as a guide means for a woman using the same in connection with her crochet work and her efforts in such work are greatly simplified and made more enjoyable by means thereof. Heretofore, it has been difficult for a woman to lay aside her work for a time and to resume the same at a later time at the exact point where she had left off without encountering great difficulties due to the fact that she has had to make certain counts, etc., etc. to determine just where she had stopped during the previous operation in order that she might continue therefrom.

With the foregoing and various other novel features and advantages and objects of our invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing, wherein:

Fig. 1 is a diagrammatic view showing a pattern for a filet which may be produced by means of the device of our invention;

Fig. 2 is a partial plan view of the device of our invention;

Fig. 3 is a small scale top sectional view of our device as shown in Fig. 2; and Figure 4 is a plan view of the guide member of our device.

Referring now to the drawing more in detail, wherein similar reference figures refer to like parts, and referring more particularly to the preferred form of our invention which has been selected for illustrative purposes, it is perhaps best to first explain what is old in the art so as to enable use to explain why our device is so important.

In the old and familiar method of charting the pattern for a crocheted piece of work so as to enable the woman to see what the piece is going to look like before she works thereon, a card 2 is provided, as is shown in Fig. 1, having squares printed thereon representing loops and having certain of these squares printed in one color so as to represent open spaces and having the remaining of these squares printed in another color so as to represent closed spaces.

In Fig. 1, we have shown the two top rows of these squares as representative of open spaces by virtue of their color white. In the third row, reading from left to right, there are two open spaces followed by two closed spaces (which are indicated as black squares and represent closed spaces) one open space, one closed space, three open spaces, one closed space, one open space, two closed spaces and two open spaces. Thus when the actual work is produced in accordance with this chart, the first two rows each consist of fifteen open spaces and the third row consists of two open spaces which are followed by two closed spaces, one open space, one closed space, three open spaces, one closed space, one open space, two closed spaces and two open spaces, so as to present an appearance substantially as is shown in the chart therefor. The completed square or filet when made in accordance with the chart looks substantially like the chart.

One desirous of making a pattern such as is shown in Fig. 1 for use as a part of a bed spread, table cloth, or the like would use this chart in connection with a set of instructions which would appear substantially as follows:

Ch 44 1 dc in 8th ch from hook * ch 2 skip 2 ch. 1 dc in 3rd st. Repeat from * 11 times (makes 13 sp.)

Ch 5 and turn 1 dc over 1st dc 2 dc over ch 1 dc over dc 2 dc over ch. 1 dc over dc (2 blocks) Ch 2 1 dc over next dc (1 space) 1 bl, 3 sp., 1 bl, 1 sp., 2 bl, 1 sp.

Ch 5 turn 1 sp., 4 bl, 3 sp., 4 bl, 1 sp.

Ch 5 turn 2 sp., 1 bl, 2 sp., 3 bl, 2 sp., 1 bl, 2 sp.

Ch 5 turn 1 sp., 2 bl, 3 sp., 1 bl, 3 sp., 2 bl, 1 sp.

Ch 5 turn 3 sp., 1 bl, 2 sp., 1 bl, 2 sp., 1 bl, 3 sp.

Ch 5 turn 3 sp., 3 bl, 1 sp., 3 bl, 3 sp.

Ch 5 turn 3 sp., 1 bl, 2 sp., 1 bl, 2 sp., 1 bl, 3 sp.

Ch 5 turn 1 sp., 2 bl, 3 sp., 1 bl, 3 sp., 2 bl, 1 sp.

Ch 5 turn 2 sp., 1 bl, 2 sp., 3 bl, 2 sp., 1 bl, 2 sp.

Ch 5 turn 1 sp., 4 bl, 3 sp., 4 bl, 1 sp.

Ch 5 turn 1 sp., 2 bl, 1 sp., 1 bl, 3 sp., 1 bl, 1 sp., 2 bl, 1 sp.

Ch 5 turn 13 sp.

Obviously these instructions are extremely difficult to interpret even though one is very experienced in such work and can readily understand the abbreviations used therein, such as:

(ch) which means chain.
(sc) which means single crochet.
(dc) which means double crochet.
(st) which means stitch.

Without any question, such a complicated system of rules which must be followed very carefully in order to produce the desired results must be simplified in order to make the hobby interesting and entertaining to the greatest number.

In cognizance of such difficulties, we have devised a means whereby these objections are overcome. We provide a crochet pattern device which preferably includes as a supporting structure, a flat member such as A, as shown in Fig. 1. This member may vary in its size and shape, and in the material from which it is made, since it may consist of a piece of wood, metal, paper, cardboard or the like, although according to the preferred form thereof, it is a small paper card which contains printed matter thereon and is divided off into squares substantially as is shown.

These squares are adapted to represent the loops in a completed piece of crocheted work. That is to say, in the first and uppermost row of squares, all of the spaces are open and accordingly on the chart, the squares are printed in red.

In the drawing, the squares have been colored so as to indicate whether the respective squares are closed or open squares (blue indicating closed spaces and red indicating open spaces). In the actual device, however, it is to be understood that merely a colored numeral or straight line or dash in a square need be used to suggest that the square represents a closed or an open square.

In order to simplify the reading of the chart, the numeral "15," indicative of the number of open squares, is placed in the first square of the top row. Inasmuch as the path of circuit in the first row is from left to right, the person crocheting knows that there are therefore fifteen of these open squares to be made. The second row is started by turning off from the first row at the end thereof and by turning back upon the work first completed and by crocheting the second row thereto from right to left. Here again, by means of the chart, the person knows that there are fifteen more open squares to be made which are crocheted to the first row. Upon the completion of the fifteenth square another turn is made downwardly so as to reverse the direction of procedure once again and to commence the third row and so on.

In that third row, the first two squares at the left hand end of the top row are marked "2" and "—" respectively and the cross hatching therein represents the color red which is indicative of open spaces. In the actual device, only the numeral "2" or the straight line "—" need be colored to make these indications to the user thereof. Such a feature adds appreciably to the desired economy in manufacturing the device. By an examination of the chart, the person crocheting understands that there are two such open spaces, since they are indicated in red. The two squares are accordingly made and then the next numeral two in black indicates that two closed spaces are to be made. Thus, the third and the fourth squares are clearly closed spaces and upon completion of the fourth square, a red numeral "1" informs the person that a single open space follows, succeeded in order by a single closed space, a series of three open spaces, a single closed space, a single open space, a series of two closed spaces and a series of two open spaces which complete the row.

The filet is completed by continuing on in a similar manner to the last square in the bottom row.

Around the body of the card A, a sliding rule member B is provided which is a thin strip of metal, paper or the like which has an intermediate portion which lies against the front face of the card. The end portions B1 are foldable upon the main portion of the rule member and provide inserts therebetween in which the card member is receivable, as is shown in Fig. 3, so that the sliding rule is slidable up and down relative to the card.

A guide member C is provided that is of relatively thin metal or the like and it is shown in flattened out relation or in plan in Fig. 4. This guide is formed to have upper and lower tabs C1 bendable or foldable relatively downwardly and upwardly on lines indicated by C2. The main body of member C is disposed on the member B as in Fig. 2 and the tabs bent or folded as described lie behind said member so that the guide is slidable along the member B. The body of the guide and tabs co-operate to more or less frictionally engage the said member B.

A cut-out portion C3 is provided in the top of the main body portion C and it is this portion which is adapted to overlie a portion of a square which it is desired to point out or to indicate otherwise for purposes of identification and the like.

The guide member C is slidable relative to the sliding member B and the sliding member B is slidable relative to the card A so that it is possible to point out and to designate any square merely by a slight adjustment of the members B and C.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

A crocheting guide means comprising in combination, a card divided into vertical rows of appropriately designated horizontally disposed spaces with each space of each row provided with a legend for designating a stitch and directing a row of crocheting, all of the said spaces in said rows being of equal width, a slide member slidably related to said card for movements vertically thereof over said spaces, a guide member slidable on said slide member and horizontally of said card having tabs at the upper edge thereof extending upwardly therefrom and spaced apart to provide a space therebetween equal to the width of said spaces.

HARRY H. KAPLAN.
HARRY H. BURTON.